(12) United States Patent
Zuardy et al.

(10) Patent No.: US 10,059,066 B2
(45) Date of Patent: Aug. 28, 2018

(54) METHOD AND SYSTEM FOR PRODUCING A PANEL MEMBER FOR AN AIRFRAME

(71) Applicant: Airbus Operations GmbH, Hamburg (DE)

(72) Inventors: Ichwan Zuardy, Hamburg (DE); Karim Grase, Hamburg (DE); Mathias Jessrang, Hamburg (DE); Martin Roehrig, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 685 days.

(21) Appl. No.: 14/463,086

(22) Filed: Aug. 19, 2014

(65) Prior Publication Data

US 2015/0080499 A1 Mar. 19, 2015

(30) Foreign Application Priority Data

Aug. 28, 2013 (EP) .................................... 13182087

(51) Int. Cl.
*B29C 70/34* (2006.01)
*B29C 70/44* (2006.01)
(Continued)

(52) U.S. Cl.
CPC ............ *B29C 70/345* (2013.01); *B29C 33/34* (2013.01); *B29C 70/443* (2013.01);
(Continued)

(58) Field of Classification Search
CPC ...................................................... B29C 33/34
See application file for complete search history.

(56) References Cited

U.S. PATENT DOCUMENTS

| | | | | | |
|---|---|---|---|---|---|
| 4,003,714 | A | * | 1/1977 | Foglino | B01J 3/03 104/94 |
| 4,022,570 | A | * | 5/1977 | Ross, Jr. | C21D 9/0062 432/124 |
| 4,444,557 | A | * | 4/1984 | Kimura | F27B 9/3011 432/136 |
| 5,152,949 | A | * | 10/1992 | Leoni | B29C 43/3642 264/257 |
| 5,403,537 | A | | 4/1995 | Seal et al. | |
| 5,824,249 | A | * | 10/1998 | Leitch | B29C 33/306 249/102 |
| 7,497,981 | B2 | | 3/2009 | Graham | |
| 2009/0072437 | A1 | * | 3/2009 | Brum | B29C 33/36 264/241 |

(Continued)

FOREIGN PATENT DOCUMENTS

DE 102010035958 * 3/2012
EP 0425240 5/1991
(Continued)

OTHER PUBLICATIONS

European Office Action, dated Feb. 23, 2016.
European Search Report, dated Jan. 20, 2014.

*Primary Examiner* — Matthew J Daniels
*Assistant Examiner* — Manley L Cummins, IV
(74) *Attorney, Agent, or Firm* — Greer, Burns & Crain, Ltd.

(57) ABSTRACT

A method of producing a composite panel member, especially a composite panel member having a foam core sandwich structure for an airframe of an aircraft or spacecraft, including: providing at least one fiber reinforcement layer in a panel molding tool; moving or transferring the molding tool to an infusion station that is pre-heated to an infusion temperature and infusing the fiber reinforcement layer in the molding tool with a polymer resin; moving or transferring the molding tool to a curing station that is pre-heated to a curing temperature and curing the at least one resin-infused fiber reinforcement layer in the molding tool to form a composite panel member; and moving or transferring the molding tool to a cooling station that is provided at a cooling temperature and cooling the composite panel member in the molding tool.

4 Claims, 5 Drawing Sheets

(51) Int. Cl.
   *B29C 33/34*    (2006.01)
   *B29D 99/00*    (2010.01)
   *C08J 5/04*     (2006.01)
   *B29K 105/04*   (2006.01)
   *B29K 105/08*   (2006.01)
   *B29K 105/00*   (2006.01)
   *B29L 31/30*    (2006.01)

(52) U.S. Cl.
   CPC ............ *B29D 99/0021* (2013.01); *C08J 5/04* (2013.01); *B29K 2105/04* (2013.01); *B29K 2105/0872* (2013.01); *B29K 2105/256* (2013.01); *B29L 2031/3082* (2013.01); *C08J 2300/00* (2013.01)

(56) References Cited

U.S. PATENT DOCUMENTS

| | | |
|---|---|---|
| 2009/0189320 A1 | 7/2009 | Bolick et al. |
| 2010/0239865 A1 | 9/2010 | Kallinen |
| 2011/0300333 A1 | 12/2011 | Kallinen |

FOREIGN PATENT DOCUMENTS

| | | |
|---|---|---|
| WO | 2008007043 | 1/2008 |
| WO | 2012025241 | 3/2012 |
| WO | 2012136222 | 10/2012 |

\* cited by examiner

METHOD AND SYSTEM FOR PRODUCING A PANEL MEMBER FOR AN AIRFRAME

CROSS-REFERENCES TO RELATED APPLICATIONS

This application claims benefit of and priority to the European patent application No. 13 182 087.0, filed Aug. 28, 2013, the entire disclosure of which is incorporated herein by way of reference.

FIELD OF THE INVENTION

This invention relates to a method of forming or producing a panel member, and especially a composite panel member having a laminated or sandwich structure, as well as to a system for forming or producing such a panel member, and a panel member produced by that method and/or system, particularly for use in an airframe structure of an aircraft or spacecraft.

The method and system of the invention is especially suitable for producing panel members for use in a fuselage structure or an airframe of an aircraft or spacecraft, especially in a primary structure, such as a tail or vertical stabilizer, and it will be convenient to describe the invention in this exemplary context. It will be appreciated, however, that the method and system of the invention are not limited to the production of panels for this application, but may be employed to produce panel members for a variety of other structures, particularly vehicle structures, such as trains, automobiles, trucks, and ships. Thus, the invention may be suitable for a range of nautical, aeronautical, automotive and aerospace applications.

BACKGROUND OF THE INVENTION

The use of composite materials in the design of aircraft and spacecraft today is becoming increasingly prevalent due to the light-weight and relatively high-strength properties achievable with those materials, among which fiber-reinforced polymer composites, such as carbon fiber reinforced polymers (CFRP), are especially preferred. For composite panel members having a foam core sandwich structure, physical properties of composite materials are not always advantageous, however. For example, the infusion or impregnation with a high-temperature resin that is typical with conventional molding techniques, like modified vacuum infusion (MVI), vacuum-assisted resin transfer molding (VARTM), or vacuum-assisted process (VAP), can lead to high residual stresses in the foam core due to a mismatch between the coefficients of thermal expansion (CTE) for the different components of the sandwich structure.

Very recently, the present applicant and assignee developed a method of producing or manufacturing a composite panel member having a sandwich structure that essentially overcomes the above problem of high residual stresses in the core. That new method or technique will be referred to as the "ZZ-process" or "ZuKZaG-process" and is described in detail in published International Patent Application WO 2012/025241 A2, the entire contents of which are incorporated herein by direct reference. In comparison with the MVI-process, the ZuKZaG-process results in somewhat longer production times or lead times. In FIG. 4 of the drawings, this comparison of the ZZ-process with the conventional MVI-process is illustrated by a chart or graph that schematically shows the variation of the temperature (vertical axis) over the duration of the process (horizontal axis). The end of the ZuKZaG-process (at or close to room temperature) is reached at a time ($\Delta t$) after the end of the MVI-process.

SUMMARY OF THE INVENTION

It is an idea of the present invention to provide a new and improved method of producing a panel member that addresses one or more of the issues discussed above. That is, it would be desirable to provide a new method and system of producing a panel member, especially a composite panel member having a sandwich structure, which largely avoids residual stresses and preferably also enables higher production rates. It would furthermore be desirable to provide a new method and system of producing a panel member that is more energy efficient and/or more economical.

According to one aspect, therefore, the invention provides a method of producing a composite panel member, and especially a composite panel member with a sandwich structure for an airframe of an aircraft or spacecraft, the method comprising:

providing one or more fiber reinforcement layer in a panel molding tool;

moving or transferring the molding tool to an infusion station, wherein the infusion station is heated to an infusion temperature, and infusing the one or more fiber reinforcement layer in the molding tool with a polymer resin;

moving or transferring the molding tool to a curing station, wherein the curing station is heated to a curing temperature, and curing the resin-infused fiber reinforcement layer(s) in the molding tool to form a composite panel member; and moving or transferring the molding tool to a cooling station, wherein the cooling station is heated to or provided at a cooling temperature, and cooling the composite panel member in the molding tool, or in at least a part thereof, towards the cooling temperature.

In this regard, the infusion station, the curing station, and the cooling station may be arranged in series and are adjacent to one another. In this regard, each of the stations may be provided as a distinct or separate part or region of a single heating unit or heating apparatus, such as an oven, through which the molding tool can be moved or transferred. Alternatively, the infusion station, the curing station and the cooling station may be provided as separate heating units or apparatuses, e.g., three separate ovens, between which the molding tool can be readily moved or transferred. Thus, in a possible embodiment of the invention the molding tool can be moved or transferred directly from the infusion station to the curing station and then to the cooling station.

In another embodiment, providing the one or more fiber reinforcement layer in the molding tool includes arranging said one or more fiber reinforcement layer adjacent a core to form one or more outer layers covering the core; e.g., on at least one sides of the core. In this regard, the core is preferably comprised of a solid foam or hard foam, especially a closed-cell foam. Laying-up fiber reinforcement layer(s) in the molding tool may take place at a lay-up station (and typically at room temperature, as it is usually performed by hand) before the molding tool is then moved or transferred to the infusion station. This one or more fiber reinforcement layer and foam core in the molding tool thereby form a semi-finished product having a sandwich structure or arrangement.

In another embodiment of the invention, the method further includes limiting or substantially preventing a change in volume of the semi-finished product, and particularly of the foam core, e.g., during the infusion and curing steps, but desirably also during the cooling step. In this way, any expansion of the foam core in the sandwich structure of the semi-finished product can be limited or substantially prevented during the panel production, which in turn can minimize generation of residual stresses in the foam core due to its different coefficient of thermal expansion compared to the CTE of the resin-infused fiber reinforcement layer(s). Limiting or substantially preventing a change in volume of the semi-finished product, and especially of the foam core, may be achieved by applying pressure to the semi-finished product to hold the core in a compressed state and thereby to act against its thermal expansion. In this regard, the molding tool may comprise at least two mold parts which define a mold cavity or space for accommodating the fiber reinforcement layer(s) and the foam core (i.e., the semi-finished product) prior to infusion with the resin. The mold parts may thus be configured to hold or to clamp the semi-finished product against its thermal expansion when the molding tool is closed.

Because each of the stations may be directly adjacent the next and heated to a predetermined operating temperature (i.e., the infusion temperature, the curing temperature, and cooling temperature) the method can be performed very energy efficiently.

In a further embodiment of the invention, the infusion temperature is a predetermined temperature and may be in the range of about 90° C. to 150° C., for example in the range of about 100° C. to 140° C., and for example in the range of about 110° C. to 130° C. In a possible example, the infusion temperature is about 120° C. The fiber reinforcement layer(s) is/are infused with the polymer resin at substantially the infusion temperature. The infusion station may be pre-heated to the infusion temperature prior to moving or transferring the molding tool to the infusion station. Alternatively, the infusion station may be heated to the infusion temperature when the molding tool is moved or transferred to it.

In a further embodiment moving or transferring the molding tool to the curing station occurs after the infusing procedure is finished or complete; for example, after a predetermined or specific infusing time.

In another embodiment of the invention, the curing temperature is a predetermined temperature and is higher than the infusion temperature. For example, the curing temperature is in the range of about 150° C. to 300° C., for example in the range of about 160° C. to 220° C., and for example in the range of about 170° C. to 190° C. For example, in a possible embodiment, the curing temperature is about 180° C. The curing station may be heated to the desired curing temperature after moving or transferring the molding tool to the curing station from the infusion station. The heating of the curing station may be gradual and may proceed in steps according to the ZuKZaG-process described in published WO 2012/025241 A2, e.g., commencing from or near the infusion temperature.

In a further embodiment, moving or transferring the molding tool to the cooling station occurs after a predetermined curing time, and desirably after the curing is finished or complete. The cooling temperature is usually a predetermined temperature and is naturally below the curing temperature. For example, the cooling temperature is in the range of about 20° C. to 80° C., for example in the range of about 25° C. to 60° C., and for example in the range of about 30° C. to 40° C. For example, in a specific embodiment, the cooling temperature is about 20° C.

In a further embodiment of the invention, cooling includes opening the molding tool. The molding tool may, for example, comprise an upper mold part and a lower mold part. The upper mold part, in turn, may include one or more resin inlet connections for feeding liquid resin into the molding tool in the infusing step. The lower mold part, on the other hand, may be supported or mounted on a transport device for moving or conveying the molding tool from one station to another. Thus, during the cooling, the method may further include moving or transferring part of the molding tool, especially the upper mold part, back to the infusion station. In this way, heat energy in the upper mold part of the molding tool assembly can be retained and transferred or exchanged back to the infusion station, while the panel member in the opened lower mold part may cool more effectively at the cooling station.

As noted at the outset, the present invention is especially concerned with a panel member having a laminated or sandwich structure comprising composite materials. In a particularly preferred embodiment of the invention, therefore, the outer layers of the panel member are comprised of fiber-reinforced polymer material like glass fiber reinforced polymer (GFRP), aramid fiber-reinforced polymer (AFRP), or preferably carbon fiber-reinforced polymer (CFRP). In this respect, the fibers may be selected from the group consisting of glass, aramid, and carbon fibers. The polymer matrix material which is infused into the layers(s) of fiber reinforcement in the molding tool may be selected from the group consisting of epoxy, polyester, vinyl ester and nylon resins. Further, a core layer is preferably a relatively low density material, such as a foam (e.g., a solid foam or a hard foam, which may have an open-cell or closed-cell structure), and preferably comprised of a synthetic, such as a polymer. Synthetic foams, like polyvinylchloride (PVC), polyurethane (PE), polyethylene (PE), or polystyrene foams, or particularly preferably poly-methacrylimide (PMI) foams, as well as syntactic foams or metallic foams may be contemplated as a material of the core layer. In this regard, a sandwich-structured composite panel is usually fabricated with first and second FRP outer layers forming two thin but stiff skins to a lightweight but relatively thick core. The core material may be a lower strength material than the outer layers, but its higher thickness provides the sandwich structure with a relatively high bending stiffness and yet with an overall relatively low density.

In a further embodiment, the panel member has a lenticular form (i.e., a lens shape) in cross-section. The benefits of this lenticular panel form are described, for example, in the published International Patent Application WO 2012/028263 A1, the contents of which are incorporated herein by reference.

Infusing the polymer resin into the molding tool and thereby impregnating the layer(s) of fiber reinforcement will involve resin infusion techniques such as vacuum bagging or resin transfer molding (RTM), e.g., vacuum-assisted resin transfer molding (VARTM). The method of the invention takes particular care through the concept of the infusing, curing and cooling steps taking place in the heated and serially arranged infusion, curing and cooling stations to essentially avoid residual stresses forming in the composite sandwich structure. This is especially important in composite panels having a foam core sandwich structure because, whereas a hard foam core will tend to contract in the cooling phase after curing, prepreg or FRP cover layers will usually have a lower coefficient of thermal expansion and be largely unaffected by the cooling, which can otherwise lead to residual stresses.

According to another aspect, the present invention provides a system for producing a composite panel member, especially a composite panel member with a sandwich structure, the system comprising:

a molding tool for receiving one or more fiber reinforcement layer and for molding a panel;

an infusion station for infusing one or more fiber reinforcement layer in the molding tool with a polymer resin, wherein the infusion station is configured or adapted to be heated to an infusion temperature;

a curing station for curing any resin-infused fiber reinforcement layers in the molding tool to form a composite panel member, wherein the curing station is configured or adapted to be heated to a curing temperature;

a cooling station for cooling the composite panel member in the molding tool, wherein the cooling station is adapted or configured to be provided at or to be heated to a cooling temperature; and a transfer mechanism for moving or transferring the molding tool from the infusion station to the curing station and to the cooling station.

In a further embodiment, the infusion station, the curing station, and the cooling station are arranged in series with one another. As noted above, they may be provided as distinct parts or regions of a single heating unit or apparatus, such as an oven. Alternatively, they may be formed by individual or separate heating units or apparatuses, such as a number of ovens. According to another embodiment, a heat exchanger is provided for salvaging heat given up at the cooling station and for returning that heat to the infusion station and/or to the curing station. Thus, the system of the invention may include a heat exchange mechanism between the infusion station and the cooling station, e.g., within the one or more heating unit or heating apparatus.

In a further embodiment, the transfer mechanism includes a transport device for moving or transferring the molding tool between the infusion station, the curing station, and the cooling station. In this regard, the transport device may be configured for sliding or rolling movement of the molding tool, and may include one or more rails. The system optionally further includes a lay-up station for placement of one or more fiber reinforcement layers in the molding tool before the molding tool is moved or transferred to the infusion station.

In a further embodiment, the molding tool has at least two mold parts which together define a mold cavity or space for accommodating the one or more fiber reinforcement layer and for molding the panel. In this regard, the mold cavity or space may also accommodate a foam core between fiber reinforcement layers to form a semi-finished product prior to infusion with the polymer resin. Desirably, the molding tool includes an arrangement designed to hold or clamp the semi-finished product against thermal expansion when the molding tool is closed. For example, upper and/or lower mold parts of the molding tool may include one or more clamping bolts and/or stiffeners or struts designed to withstand the thermal expansion forces generated in the foam core during infusion, curing and/or cooling. In this way, the molding tool can be configured to limit or substantially prevent a change in volume of the semi-finished product, and especially of the foam core, e.g., during infusion and curing and desirably also during the cooling step.

In a further embodiment, the system further includes a digital controller for controlling or regulating a temperature in the infusion station and/or in the curing station and/or in the cooling station. In this regard, the controller may include a temperature sensor or a thermostat at each station for monitoring the respective temperature, and software for controlling or regulating the heating of the respective station; for example, based on the time required for performing the infusion, the curing, and/or the cooling in the respective station, and/or based on a specific regime for temperature change, such as the stepwise heating of the curing station according to the ZuKZaG-process.

According to another aspect, the present invention provides a panel member produced by a method according to any one of the embodiments described above, especially for use in an empennage or wing structure or other airframe structure of an aircraft.

According to a further aspect, the present invention provides a vehicle, such as an aircraft or spacecraft, having a body or airframe structure that includes one or more panel member produced by a method according to any one of the embodiments described above.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which:

FIG. 1(*b*) is a perspective view the system shown in FIG. 1(*a*) in a transparent representation;

FIG. 1(*c*) is an end view of the molding tool assembly of the system in FIGS. 1(*a*) and 1(*b*) taken in the direction of arrow D;

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

DETAILED DESCRIPTION OF THE PREFERRED EMBODIMENTS

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
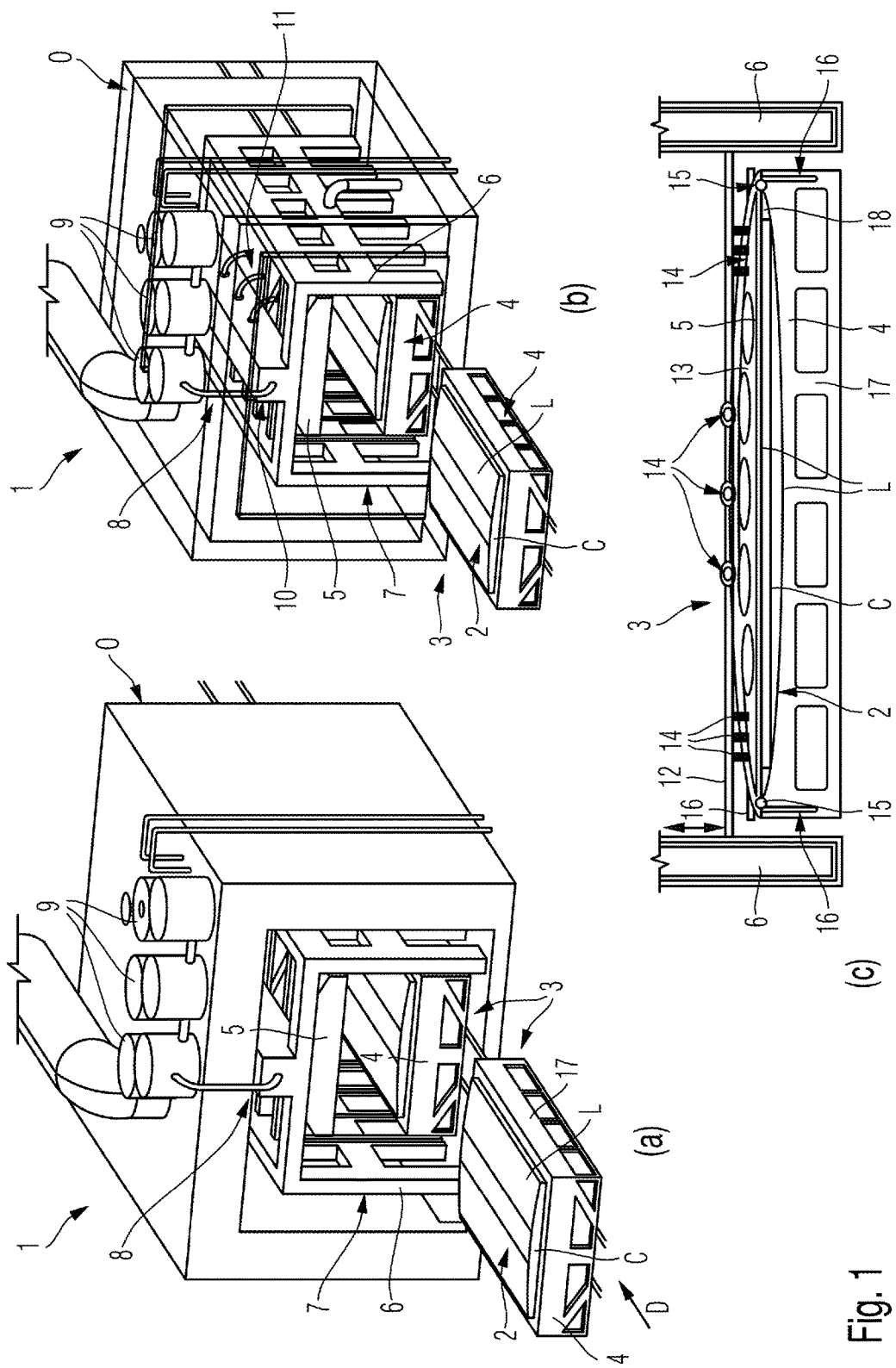
FIG. 1(*a*) is a perspective view of a system for producing a composite panel member for a tail or wing of an aircraft according to an embodiment.

With reference firstly to FIGS. 1(a) to 1(c) of the drawings, the components of a system 1 for producing or manufacturing a composite panel member 2 for an empennage or wing of an aircraft is illustrated. As will be appreciated by persons skilled in the art, both the vertical tail plane (VTP) and wings of an aircraft are often formed having a central box structure typically comprising a number of spars and ribs which are then covered with panel members 2 to provide an outer or aerodynamic skin. With the current manufacturing trends, the panel members 2 are often fabricated from fiber-reinforced polymer (FRP) composites and preferably in a foam core sandwich construction. Furthermore, in light of recent design developments, the panel members 2 to be mounted on the box structures of the tail and the wings have a lens shape or "lenticular" form in cross-section. The benefits of the lenticular panel form are described, for example, in the published International Patent Application WO 2012/028263 A1, the entire contents of which are to be incorporated herein by reference.

Referring to FIGS. 1(a), 1(b) and 1(c), the system 1 includes a large heating apparatus or oven O, within which a molding tool 3 having a lower mold part 4 and an upper mold part 5 is employed to form the panel member 2. Frame members 6, each having an inverted U-shape, stand over and span the molding tool 3 within the oven O to form a support frame 7 for supporting a resin feed assembly 8. The resin feed assembly 8 comprises a resin reservoir 9 and a resin distributor 10 that includes a network of resin feed lines or feed conduits 11 in connection with the upper mold part 5 for introducing the liquid resin into a mold cavity in the molding tool 3. In this regard, the positioning of the resin feed assembly 8, and especially the resin reservoir 9 (e.g., tanks), at an elevated position above the molding tool 3 generates a pressure head in the resin supply. This can help avoid or counteract difficulties in the permeability of the reinforcement fiber fabric layer/s during the production of panels having a foam core sandwich structure, especially in a "constant volume" procedure, where pressure is applied to maintain a substantially constant core volume.

The upper mold part 5 essentially forms a lid or closure for the mold cavity and is movably supported on crossbeams 12 connected to vertical legs of the frame members 6 to move up and down for opening and closing the molding tool 3. A number of stiffening ribs 13 is provided across the upper mold part 5 for a strong and rigid connection with cross-beams 12 at weld points 14. This strength and rigidity is important when the upper mold part 5 is driven down and clamped to the lower mold part 4 against sealing beads 15 via bolts 16 to close and seal the mold cavity under pressure, e.g., 2 bar of pressure. As is apparent from FIGS. 1(a) and 1(b), the lower mold part 4 includes a base 17 and at least partially defines a cavity 18 that is laid up with layers L of fiber reinforcement, such as woven as well as non-woven fabric (NCF) sheets, and a hard foam core C. In FIG. 1(c), the molding tool 3 can be seen with the upper and lower mold parts 4, 5 clamped via bolts 16 in the closed position.

In this way, the semi-finished product formed by the foam core C covered by the layers L of fiber reinforcement is clamped in the cavity 18 of the molding tool 3 under pressure to limit or substantially prevent volume change via thermal expansion.

Figure 2:
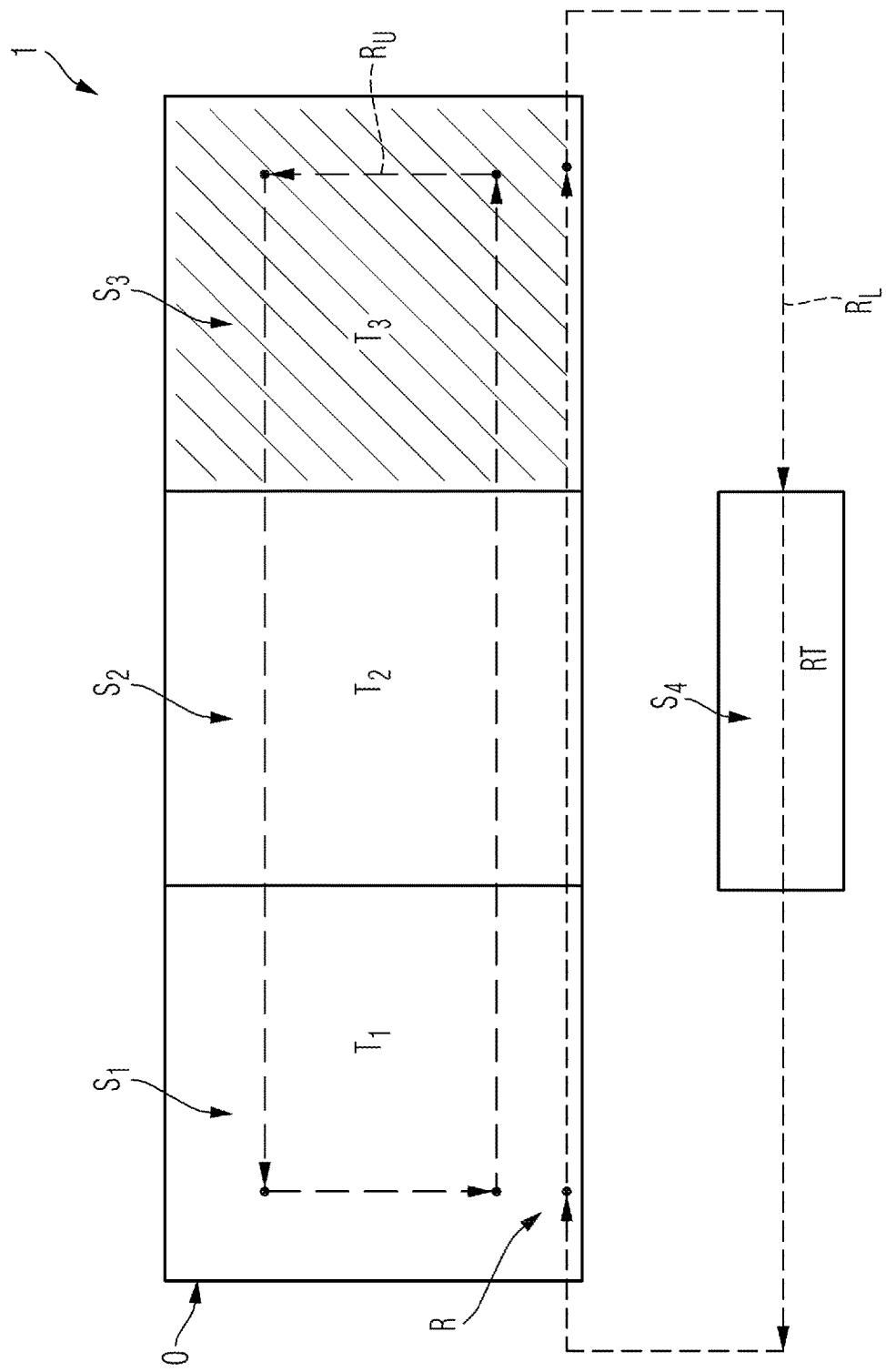
FIG. 2 is a schematic side view of resin infusion, curing and cooling stations for producing a panel member by a method according to a further embodiment of the invention.

Turning now to FIG. 2 of the drawings, a series of production stations S1, S2, S3 in the system 1 for manufacturing or producing the composite panel 2 according to a preferred embodiment of the invention is shown schematically. The first of these is an infusion station S1 for infusing the fiber reinforcement layers L around the core C in the molding tool 3 with a polymer resin from the reservoir 9. In other words, the closed molding tool 3 with the support frame 7 and the resin feed assembly 8 are provided in infusion station S1, which forms a part or region of the large heating apparatus O and is heated to a predetermined infusion temperature T1 of about 120° C. The resin is then introduced into the molding tool 3 via the resin feed assembly 8, the reservoir 9 and distributor 10. After the resin has been infused into the molding tool 3 at the infusion temperature T1 to impregnate the fiber reinforcement layers L in the mold cavity 18, a transport device R is controlled to move or transfer molding tool 3 to a curing station S2 for curing the now resin-infused fiber reinforcement layers L in the molding tool 3 to form the composite panel member 2. To this end, the curing station S2 also forms a part or region of heating apparatus O and is heated step-wise via the ZZ-process to a predetermined curing temperature T2 of about 180° C. After the curing of the polymer resin has been completed (e.g., after a predetermined curing time or period) the transport device R, which may for example include rails for rolling and/or sliding movement of the molding tool 3, is employed to transfer molding tool 3 to the next adjacent production station, namely to cooling station S3. As apparent from the name, the cooling station S3 is designed to provide controlled cooling of the composite panel member 2 in the molding tool 3. To this end, the cooling station S3 also forms a part or region of the heating apparatus or oven O at a cooling temperature T3. This allows a controlled cooling of the panel member 2 from the curing temperature T2.

It will be noted that the transport mechanism R provides two transport paths, namely a lower path RL, which corresponds to the transport path of the lower mold part 4, and an upper path RU, which corresponds to the transport path of the upper mold part 5. From the infusion station S1 to the cooling station S3 these lower and upper paths RL, RU run together because the upper and lower mold parts 4, 5 of the molding tool 3 are clamped closed. In the cooling station S3 in the course of the cooling phase, however, the molding tool 3 is opened such that the upper mold part 5 is lifted away from the lower mold part 4, which contains the newly formed panel member 2. In this manner, upper mold part 5 together with the support frame 7 and resin feed assembly 8 are transported back along upper path RU to the infusion station S1. As such, the upper mold part 5 remains within the heating apparatus O for the next panel production. The lower mold part 4 with the panel member 2, on the other hand, cools at the cooling station S3 then is transported along the lower path RL out of the heating apparatus O to a lay-up station S4. At the lay-up station S4 the newly formed panel member 2 is removed from the lower mold part 4 and the lower mold part 4 can then be prepared for the next panel production, i.e., by placement of fiber reinforcement layers L and the foam core C into the mold cavity 18 (e.g., manually at room temperature).

Thereafter, the lower mold part 4 of the molding tool 3 is moved or transferred into the infusion station S1, where it is combined and closed with the upper mold part 5 to perform the infusing step. The continuous but segmented oven system with portal and guidance of the mold parts 4, 5 along the paths RU, RL via the transport device R reduces the overall energy consumption and can be implemented with the standard resin infusion processes. In particular, the fact that upper mold part 5 and parts of support frame 7 remain within the heating apparatus O provides a heat exchange mechanism which transfers and conserves heat energy between the stations S1, S2, S3 to promote the energy efficiency of the system 1.

It will be appreciated that the molding tool 3 need not be opened in the cooling station S3. That is, the cooling may be conducted with the molding tool 3 in the closed state. After cooling in the cooling station S3, the entire molding tool 3 may then be transferred to the lay-up station S4 where it is further cooled and opened to remove the finished or completed panel 2. In this embodiment, however, the support frame 7 and the resin feed assembly 8 will still remain in the heating apparatus or oven O for interconnection with the next laid-up molding tool 3 introduced into the infusion station S1.

Figure 3:
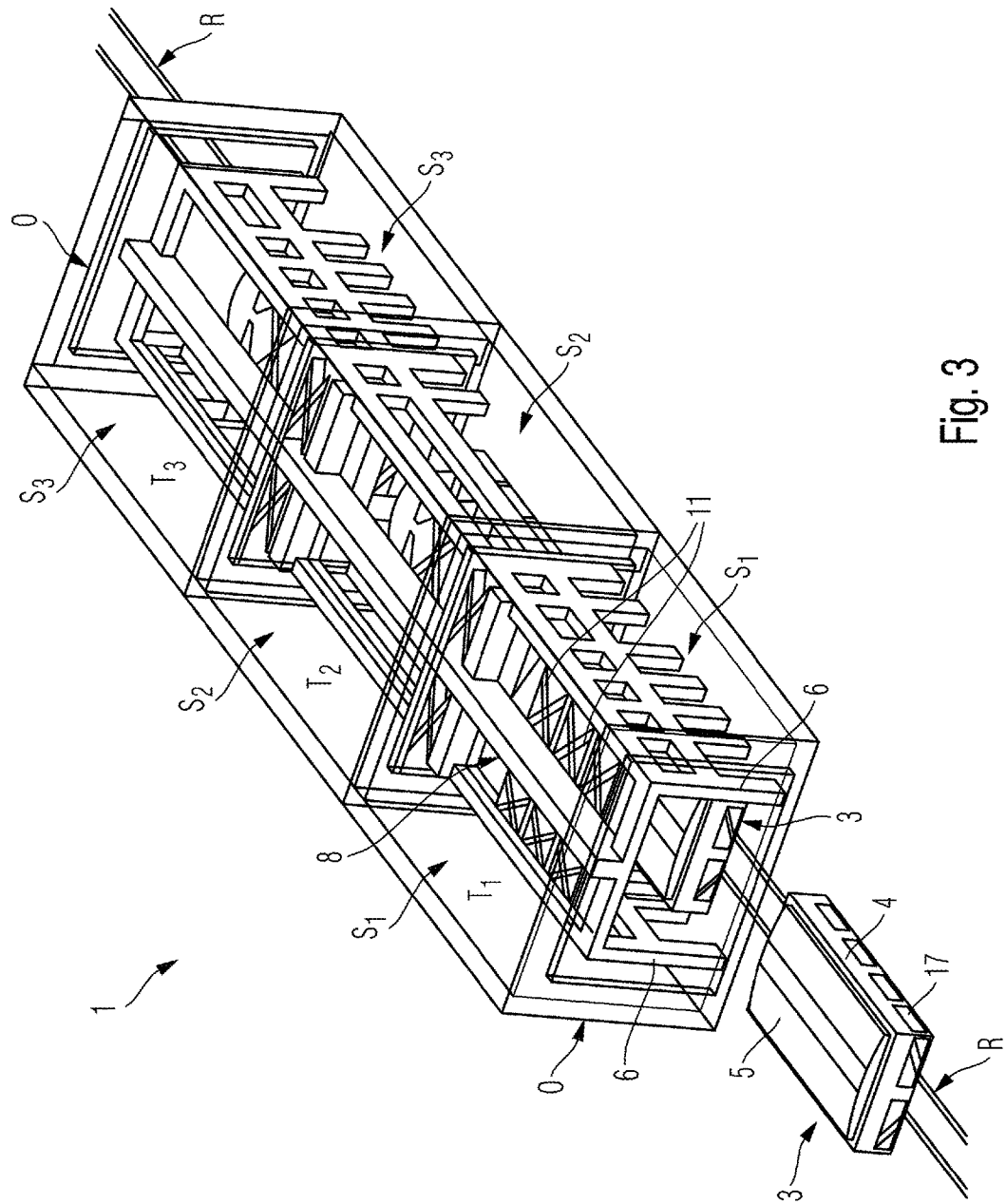
FIG. 3 is a perspective view of the system for producing a panel member according to a further embodiment of the invention.
Figure 4:
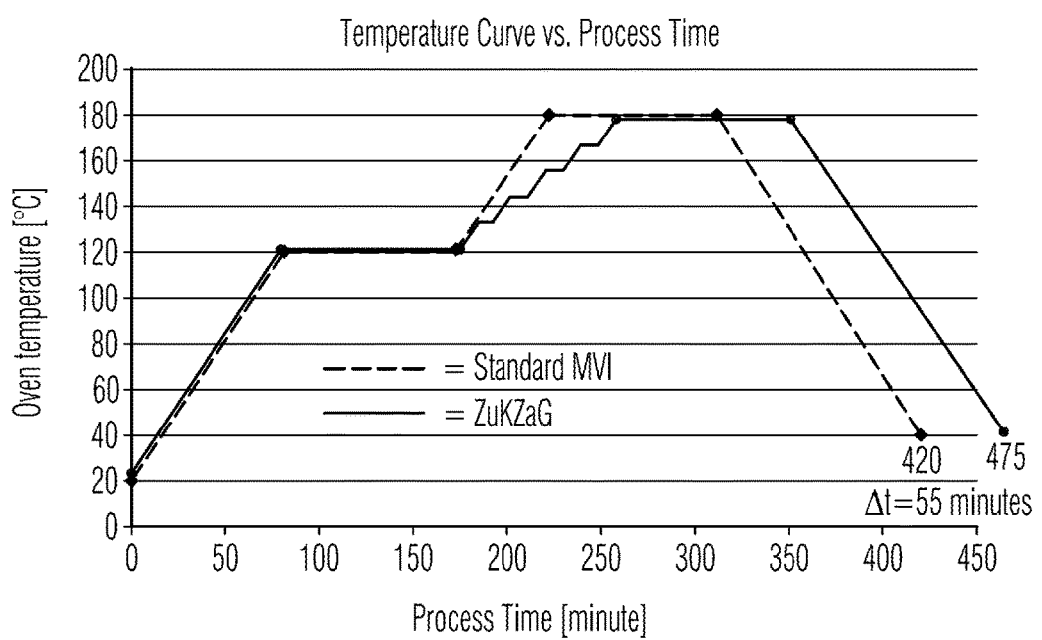
FIG. 4 is a diagram illustrating temperature progression of an exemplary MVI production process compared with the ZZ process.

FIG. 3 of the drawings shows a perspective view of the system 1 for producing the panel member 2. The molding tool 3 can be seen supported on the transport device R which includes rails or tracks for conveying the molding tool 3 through the stations S1, S2, S3. In addition, the frame members 6 of the support frame 7 for supporting the resin feed assembly 8 with the network of resin feed lines 11 are provided within the infusion station 51 for connection with an upper mold part 5 of the molding tool 3 and at least some components thereof may move with the molding tool 3 via the transport device R between the infusion station 51, the curing station S2 and the cooling station S3.

Figure 5:
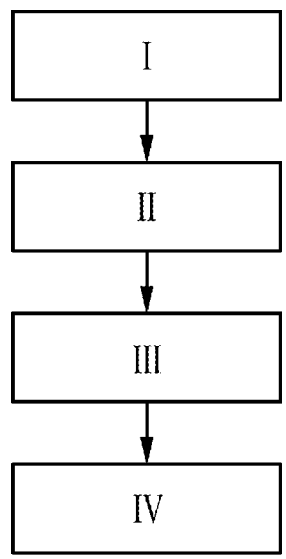
FIG. 5 is a flow diagram which schematically illustrates a method according to another embodiment of the invention.

Referring now to FIG. 5 of the drawings, a flow diagram is shown that schematically illustrates the steps in a method of forming a panel member 1 according to the embodiments of the invention described above with respect to FIGS. 1(a) to 3. In this regard, the first box I of FIG. 5 represents the step of laying-up fiber reinforcement layers L and a foam core C in a lower mold part 4 of the panel molding tool 3. The molding tool 3 is then clamped closed with an upper mold tool part 5 via clamping bolts 16 to hold the volume of the foam core C substantially constant against thermal expansion. The second box II represents the step of then moving or transferring the molding tool 3 to the infusion station S1, which is heated to an infusion temperature T1, and infusing the laid-up fiber reinforcement layers L in the molding tool 3 with the polymer resin. The third box III of FIG. 5 represents the step of moving or transferring the molding tool 3 to the curing station S2, which is then heated stepwise via the ZZ-process to the curing temperature T2, and curing the resin-infused fiber reinforcement layers L in the molding tool 3 to form a composite panel member 2. Then, the fourth box IV in FIG. 5 represents the step of moving or transferring the molding tool 3 to a cooling station S3, which may have been pre-heated to the cooling temperature T3, and cooling the composite panel member 2 in the molding tool 3 at cooling station S3. Thereafter, the newly formed panel 2 may be removed from the mold cavity 18 at the lay-up station S4.

Figure 6:
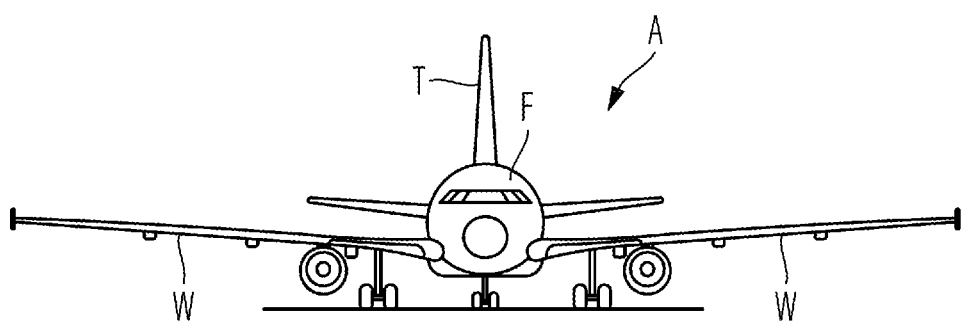
FIG. 6 is a schematic illustration of an aircraft in which one or more panel member according to another embodiment of the invention is installed.

Finally, with reference to FIG. 6, a schematic illustration is shown of an aircraft A having an airframe, including the tail T and wings W as well as the fuselage F, in which one or more panel members 1 formed by a method according to any one of the embodiments of the invention described above, e.g., as described in reference to FIG. 2, FIG. 3, or FIG. 5, is/are included.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e., non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for producing a composite panel member with a sandwich structure, the system comprising:
   a molding tool for receiving at least one fiber reinforcement layer and for molding a panel;
   an infusion station for infusing the at least one fiber reinforcement layer in the molding tool with a polymer resin, wherein the infusion station is adapted to be heated to an infusion temperature;
   a curing station for curing the at least one resin-infused fiber reinforcement layer in the molding tool to form a composite panel member, wherein the curing station is configured to be heated to a curing temperature;
   a cooling station for cooling the composite panel member in the molding tool, wherein the cooling station is configured to be provided at or heated to a cooling temperature; and
   a transfer mechanism for moving or transferring the molding tool from the infusion station to the curing station and from the curing station to the cooling station;

wherein the infusion station, the curing station, and the cooling station are arranged in series adjacent to one another and are provided as distinct regions of a single heating apparatus.

2. The system according to claim 1, wherein the transfer mechanism includes a sliding or rolling transport device arranged to transport the molding tool between the infusion station, the curing station, and the cooling station.

3. The system according to claim 1, wherein the molding tool has at least two mold parts which together define a mold cavity for accommodating the at least one fiber reinforcement layer and for molding the panel, wherein the mold parts are configured to hold or clamp the panel member against thermal expansion when the molding tool is closed; and wherein the system further comprises a digital controller for controlling or regulating a temperature in the infusion station and/or in the curing station and/or in the cooling station.

4. The system according to claim 2, wherein the transfer mechanism includes a lay-up station for placement of the at least one fiber reinforcement layer in the molding tool.

\* \* \* \* \*